(No Model.)
E. COWAN.
SWEEP FOR CORN AND COTTON CULTIVATORS.
No. 392,590. Patented Nov. 13, 1888.
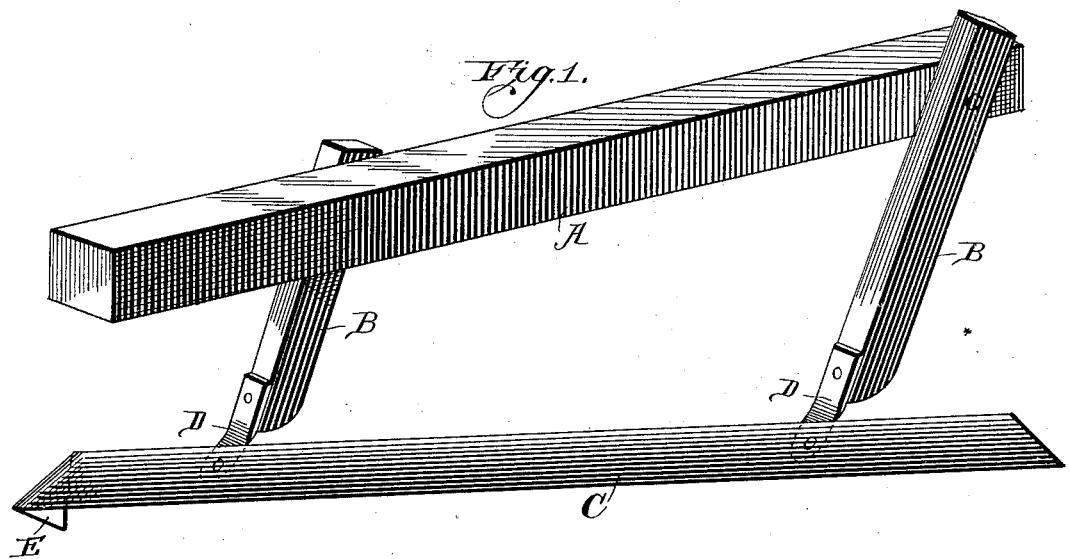
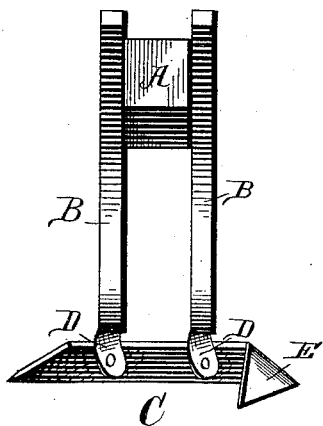
Witnesses.
Henry G. Dieterich.
R. W. Bishop.
Inventor,
Elias Cowan,
By his Attorneys

UNITED STATES PATENT OFFICE.

ELIAS COWAN, OF GRANGER, TEXAS.

SWEEP FOR CORN AND COTTON CULTIVATORS.

SPECIFICATION forming part of Letters Patent No. 392,590, dated November 13, 1888.

Application filed July 26, 1888. Serial No. 281,089. (No model.)

*To all whom it may concern:*

Be it known that I, ELIAS COWAN, a citizen of the United States, residing at Granger, in the county of Williamson and State of Texas, have invented a new and useful Improvement in Sweeps for Corn and Cotton Cultivators, of which the following is a specification.

My invention relates to improvements in sweeps for corn and cotton cultivators; and it consists in certain novel features, hereinafter first fully described and then specifically claimed.

In the accompanying drawings, Figure 1 is a perspective view of my improved device. Fig. 2 is a rear view of the same.

Referring to the drawings by letter, A designates an ordinary plow or cultivator beam, and B B the standards secured to the opposite sides of the same, near its opposite ends and depending therefrom.

C designates my improved sweep, which is composed of a long steel plate or blade, as shown. To the rear edge of the sweep I secure, by riveting or welding, the projections D of iron, which are secured to the lower ends of the standards. The projections may be formed integral with the blade, however, if so preferred.

The front end of the sweep is bent downward and backward, thereby forming the lip E, which passes into the earth and prevents the sweep diverging from its path. The projections D are properly twisted, as shown, to hold the sweep at an angle of about thirty degrees to the line of draft.

In practice the cultivator or plow is drawn over the ground in the usual manner. The sweep then cuts into the ground and runs along a few inches below the surface, thereby loosening the earth and preventing the baking and cracking of the same. The lip at the front end of the sweep takes into the earth, as before stated, and prevents the sweep turning in the direction of its length, so that the cutting-edge will always be toward the front.

In using the sweep on a cultivator that has a beam on each side of the row and are braced apart it is not necessary to have the lip E, as the brace between the beams holds the sweep apart when adjusted to suit the work. When used in this manner, the sweeps are made to diverge rearwardly, as will be readily understood.

The device is very cheap and simple, and its advantages are thought to be obvious.

Having thus described my invention, what I claim, and desire to secure by Letters Patent, is—

1. A cultivator-sweep comprising a long thin blade, having its front end bent downward and rearward, forming a lip, E, adapted to take into the earth, for the purpose specified.

2. The combination of the beam, the standards secured thereto, and the blade having the projections secured to the standards and having the downward and rearward turned lip E at its front end, as specified.

In testimony that I claim the foregoing as my own I have hereto affixed my signature in presence of two witnesses.

ELIAS COWAN.

Witnesses:
S. A. EARLEY, Jr.,
R. SHRUBAR.